(12) United States Patent
Clarke-Stapleton et al.

(10) Patent No.: US 9,545,884 B1
(45) Date of Patent: Jan. 17, 2017

(54) RV TANK STORAGE RACK

(71) Applicants: Karen Clarke-Stapleton, Fenton, MI (US); Scott Hedglin, Fenton, MI (US)

(72) Inventors: Karen Clarke-Stapleton, Fenton, MI (US); Scott Hedglin, Fenton, MI (US)

( * ) Notice: Subject to any disclaimer, the term of this patent is extended or adjusted under 35 U.S.C. 154(b) by 78 days.

(21) Appl. No.: 14/715,804

(22) Filed: May 19, 2015

(51) Int. Cl.
*B60R 11/00* (2006.01)
*B60P 3/08* (2006.01)
*B60R 9/06* (2006.01)
*B60R 15/04* (2006.01)
*B60P 3/36* (2006.01)

(52) U.S. Cl.
CPC . *B60R 9/06* (2013.01); *B60P 3/36* (2013.01); *B60R 15/04* (2013.01)

(58) Field of Classification Search
CPC ............ B60R 9/06; B60R 15/04; B60R 11/00; B60P 3/08
See application file for complete search history.

(56) References Cited

U.S. PATENT DOCUMENTS

| | | | | |
|---|---|---|---|---|
| 5,011,361 A | * | 4/1991 | Peterson | B60R 9/06 224/497 |
| 5,018,651 A | * | 5/1991 | Hull | B60R 9/06 224/280 |
| 5,033,662 A | * | 7/1991 | Godin | B60R 9/065 224/506 |
| 5,199,842 A | * | 4/1993 | Watt | A61G 3/0209 224/497 |
| 5,533,771 A | * | 7/1996 | Taylor | B62D 33/0273 108/44 |
| 5,536,130 A | * | 7/1996 | Edensor | B60R 9/065 224/495 |
| 5,676,292 A | * | 10/1997 | Miller | B60R 9/06 224/282 |
| 5,680,976 A | * | 10/1997 | Koliopoulos | B60R 9/06 224/282 |
| 5,826,768 A | * | 10/1998 | Gamulo | B60R 9/06 224/484 |
| 6,135,532 A | | 10/2000 | Martin | |
| 6,193,124 B1 | | 2/2001 | Brazil | |
| 6,345,749 B1 | | 2/2002 | Hamilton | |
| 6,379,101 B1 | * | 4/2002 | Breaux | B60P 1/43 224/521 |
| 6,899,375 B2 | | 5/2005 | Sankrithi | |
| D528,497 S | | 9/2006 | Ezra | |
| 7,621,565 B2 | | 11/2009 | Ross, Jr. | |
| 8,449,239 B1 | | 5/2013 | Birkenstock | |

(Continued)

FOREIGN PATENT DOCUMENTS

WO   WO2011045034   4/2011

*Primary Examiner* — Brian D Nash

(57) ABSTRACT

The RV tank storage rack is adapted to attach onto a rear bumper of an RV, and support a portable sewage tank there from. The RV tank storage rack includes a folding ramp, a tank platform, and a back support frame. The tank platform is positioned between the folding ramp and the back support frame. The tank platform is adapted to receive a portable sewage tank. A mounting member extends from underneath the tank platform. The mounting member is adapted to secure the RV tank storage rack onto a rear bumper of an RV. The folding ramp is hingedly connected with the tank platform, and rotates downwardly in order to adaptively enable the portable sewage tank to be rolled onto or off of the tank platform.

10 Claims, 4 Drawing Sheets

(56) References Cited

U.S. PATENT DOCUMENTS

| | | | |
|---|---|---|---|
| 2002/0005423 A1* | 1/2002 | Grover | B60R 9/06 224/509 |
| 2005/0214091 A1* | 9/2005 | Daneshvar | A61G 3/0209 410/13 |
| 2010/0000714 A1* | 1/2010 | Daneshvar | A47B 9/14 165/75 |

* cited by examiner

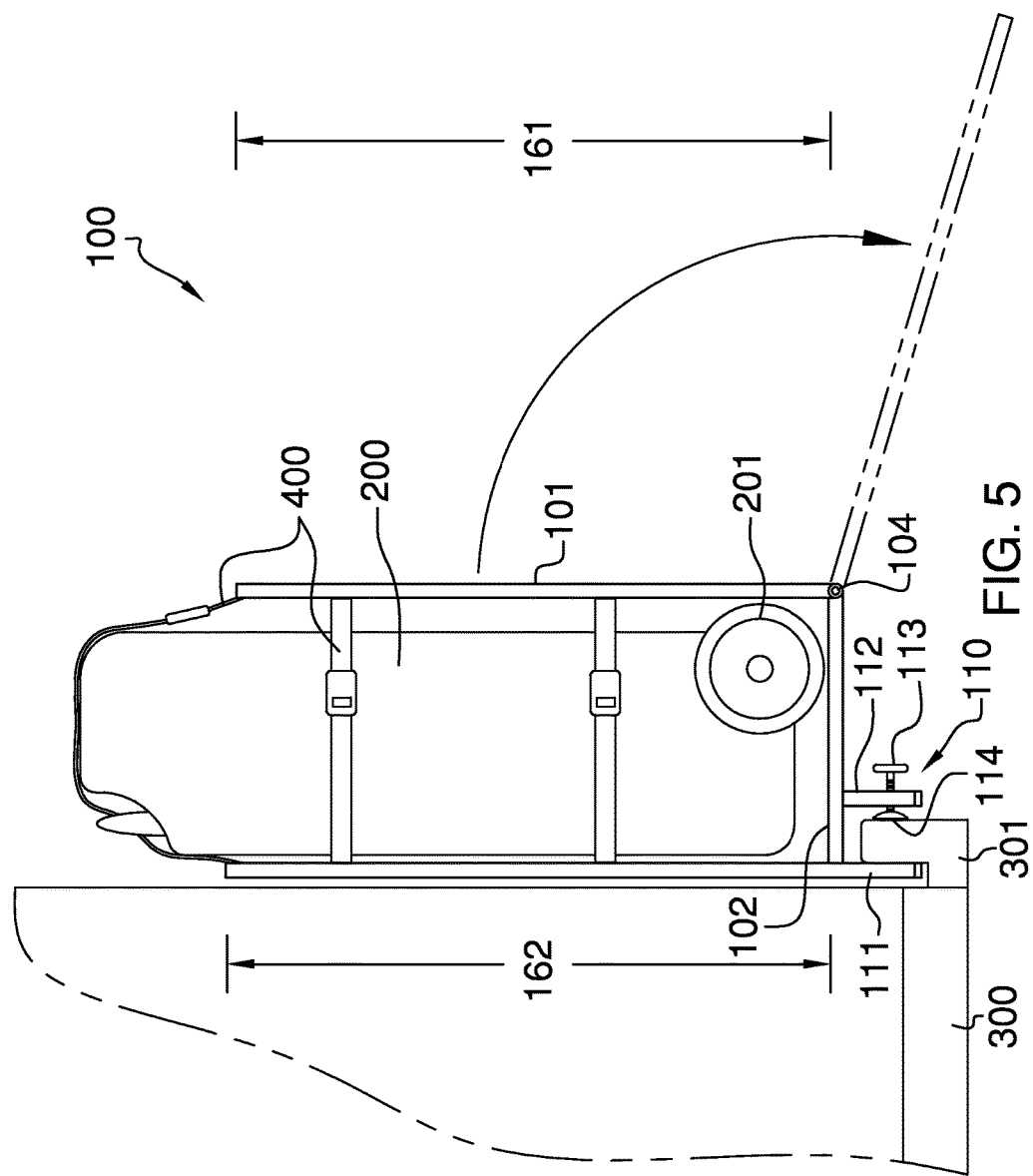

US 9,545,884 B1

RV TANK STORAGE RACK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of portable sewage tanks for an RV, more specifically, a tank storage rack that is adapted to attach onto the rear bumper of an RV in order to store the portable sewage tank thereon.

SUMMARY OF INVENTION

The RV tank storage rack is adapted to attach onto a rear bumper of an RV, and support a portable sewage tank there from. The RV tank storage rack includes a folding ramp, a tank platform, and a back support frame. The tank platform is positioned between the folding ramp and the back support frame. The tank platform is adapted to receive a portable sewage tank. A mounting member extends from underneath the tank platform. The mounting member is adapted to secure the RV tank storage rack onto a rear bumper of an RV. The folding ramp is hingedly connected with the tank platform, and rotates downwardly in order to adaptively enable the portable sewage tank to be rolled onto or off of the tank platform.

These together with additional objects, features and advantages of the RV tank storage rack will be readily apparent to those of ordinary skill in the art upon reading the following detailed description of the presently preferred, but nonetheless illustrative, embodiments when taken in conjunction with the accompanying drawings.

In this respect, before explaining the current embodiments of the RV tank storage rack in detail, it is to be understood that the RV tank storage rack is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the RV tank storage rack.

It is therefore important that the claims be regarded as including such equivalent construction insofar as they do not depart from the spirit and scope of the RV tank storage rack. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a side view of an embodiment of the disclosure in use.

DETAILED DESCRIPTION OF THE EMBODIMENT

Figure 1:
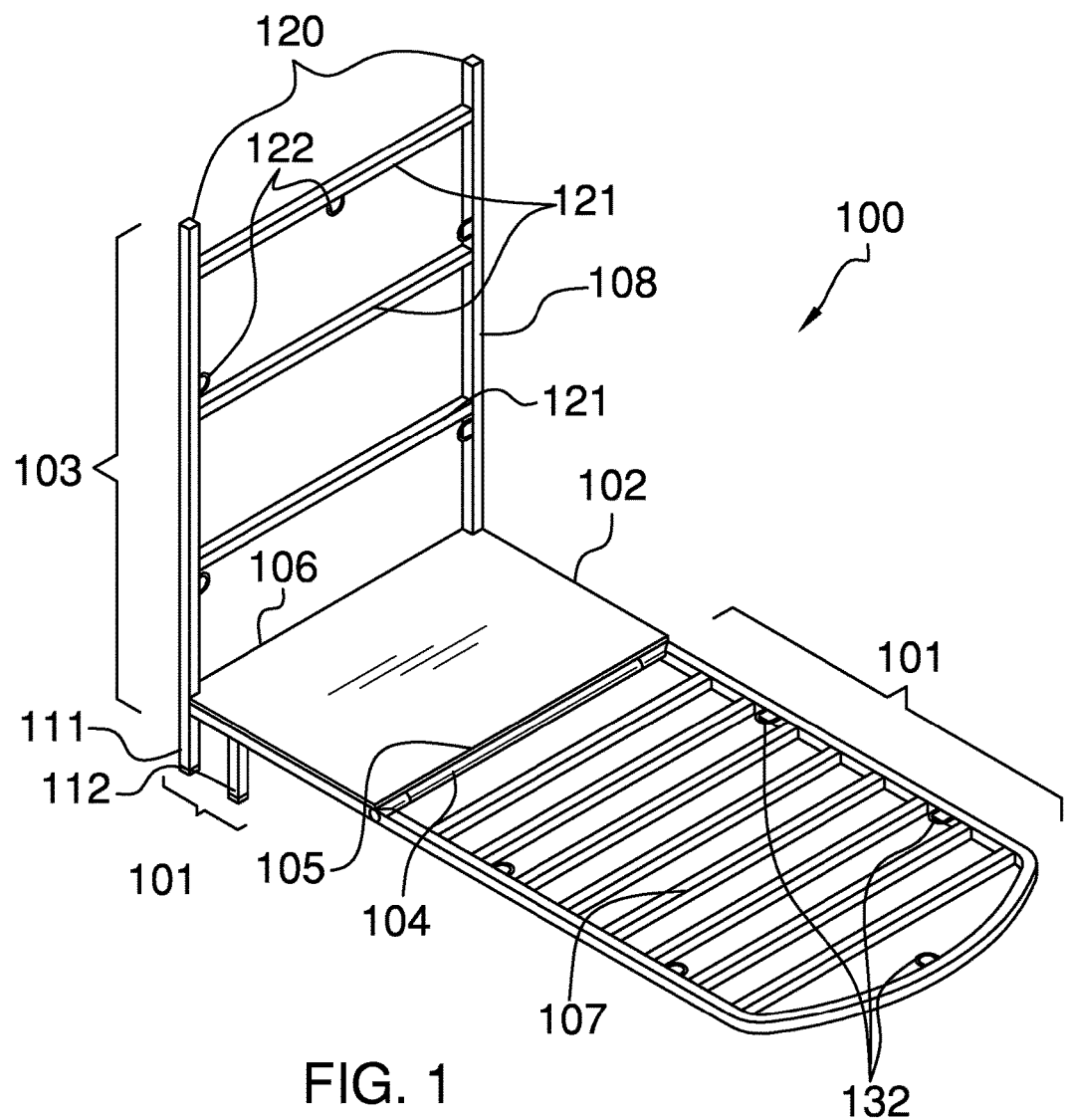
FIG. 1 is a perspective view of an embodiment of the disclosure.
Figure 2:
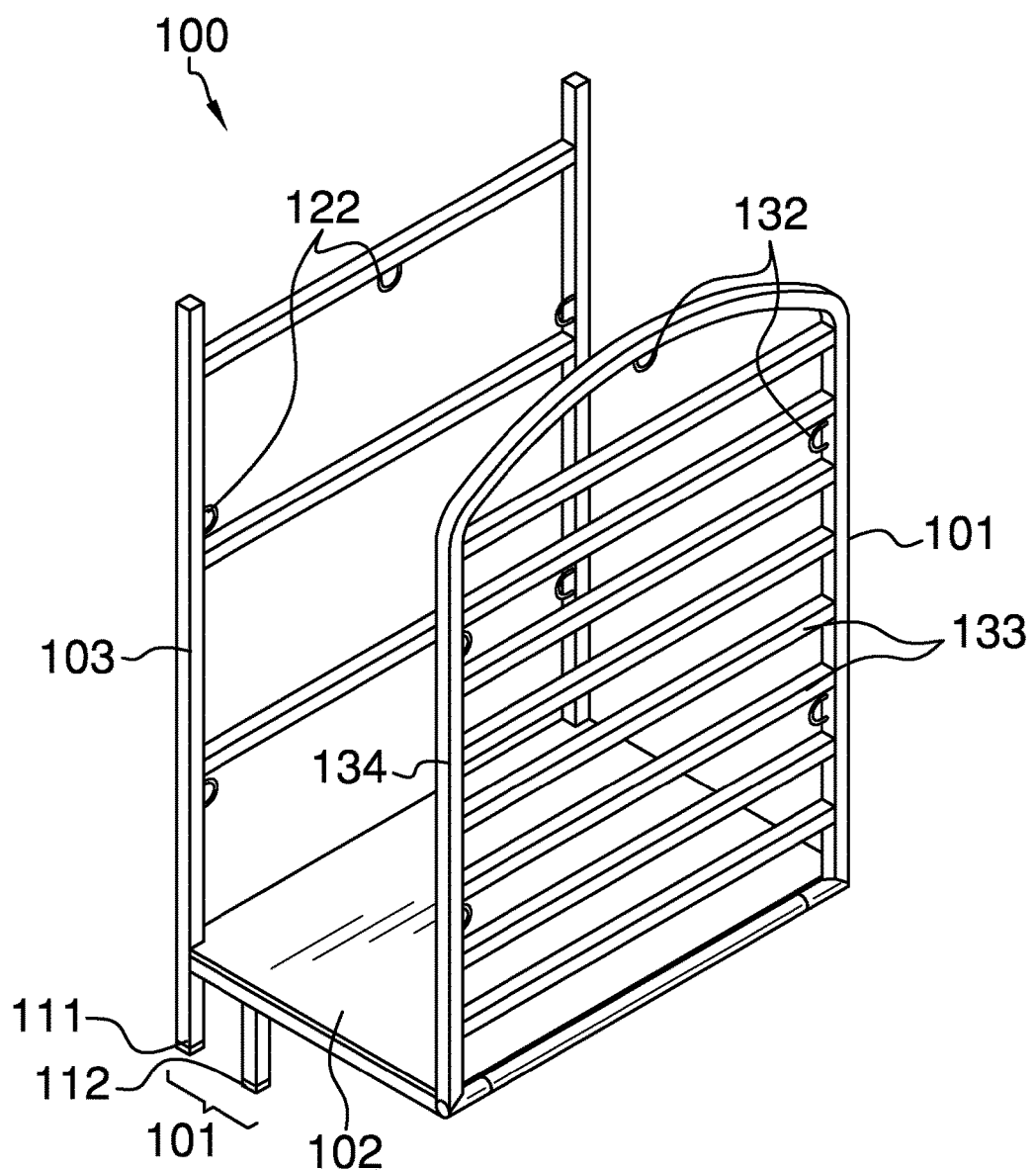
FIG. 2 is a second perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to several potential embodiments of the disclosure, which are illustrated in FIGS. 1 through 5. The RV tank storage rack 100 (hereinafter invention) comprises a folding ramp 101, a tank platform 102, and a back support frame 103. The tank platform 102 is adjacent the back support frame 103 and the folding ramp 103. Moreover, the tank platform 102 is situated between the back support frame 103 and the folding ramp 101.

The folding ramp 101 is attached to a first hinge 104 located on a first edge 105 of the tank platform 102. Moreover, the first hinge 104 enables the folding ramp 101 to rotate from a vertical orientation to a lowered position. The back support frame 103 is located on a second edge 106 of the tank platform 102. The second edge 106 is opposite of the first edge 105. The back support frame 103 is perpendicular with respect to the tank platform 102.

The folding ramp 101 is further defined with a top ramp surface 107 that is adapted to receive a portable sewage tank 200 thereon. Moreover, the portable sewage tank 200 is able to be rolled onto the folding ramp 101, and onto the tank platform 102. The portable sewage tank 200 is well known in the field of RVs. Moreover, the portable sewage tank 200 has tank wheels 201 that enable the portable sewage tank 200 to be rolled onto the folding ramp 101 as well as the tank platform 102.

The invention 100 includes mounting member 110 that extends from underneath the tank platform 102. The mounting member 110 is an extension of the back support frame 103. The mounting member 110 is further defined with a first mount member 111 and a second mount member 112. The first mount member 111 is parallel with the second mount member 112. A threaded member 113 is threadably engaged with respect to the second mount member 112. The threaded member 113 rotates to extend a clamp member 114 back and forth. The clamp member 114 is positioned between the first mount member 111 and the second mount member 112. The clamp member 114 and the first mount member 111 are adapted to engage a rear bumper 301 of an RV 300.

The back support frame 103 is further defined with an a third support surface 108, which is adapted to interface with the portable sewage tank 200. The back support frame 103 is also further defined with a pair of vertical members 120 that support a plurality of horizontal members 121 there between. The back support frame 103 includes a plurality of first eyelets 122. The plurality of first eyelets 122 are to be used in concert with straps 400 in order to secure the portable sewage tank 200 thereto.

It shall be noted that the folding ramp 101 may include a plurality of second eyelets 132. The plurality of second eyelets 132 may be used in concert with the plurality of first eyelets 122 in order to secure the portable sewage tank 200 between the back support frame 103 and the folding ramp 101. The folding ramp 101 includes a plurality of second horizontal members 133. The plurality of second eyelets 132 are provided on the plurality of second horizontal members 133 as well as a perimeter ramp member 134. The plurality of second horizontal members 133 are affixed to the perimeter ramp member 134.

Figure 3:
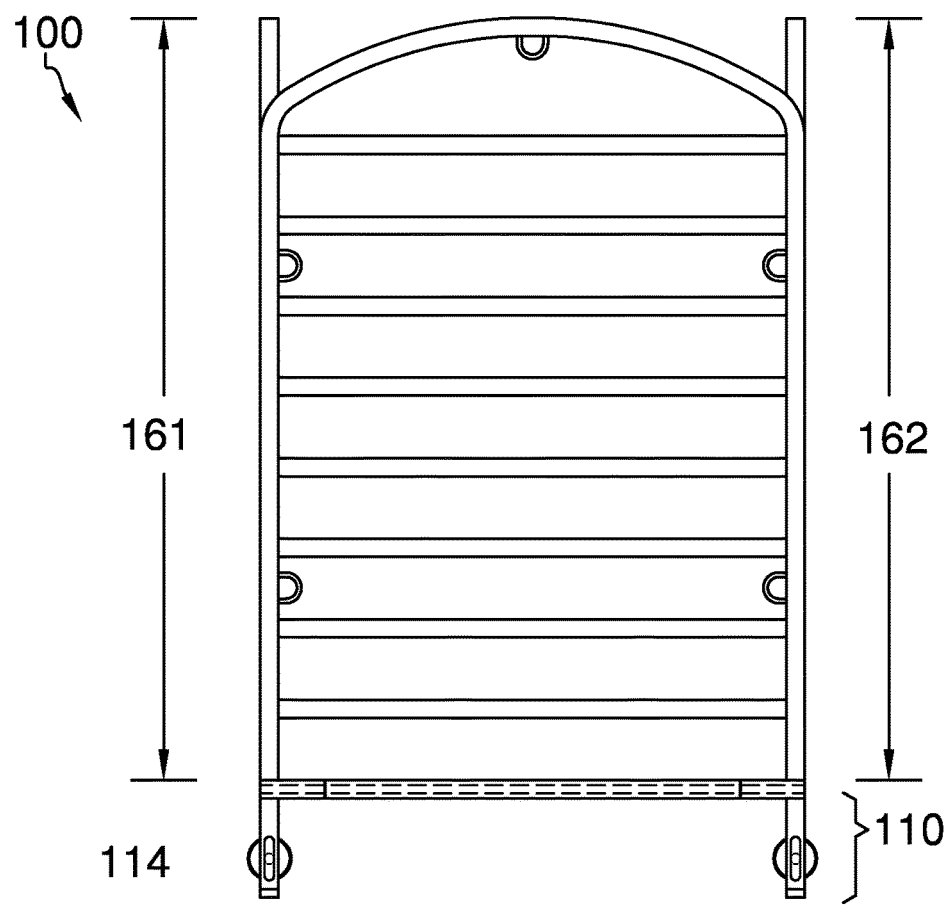
FIG. 3 is a front view of an embodiment of the disclosure.
Figure 4:
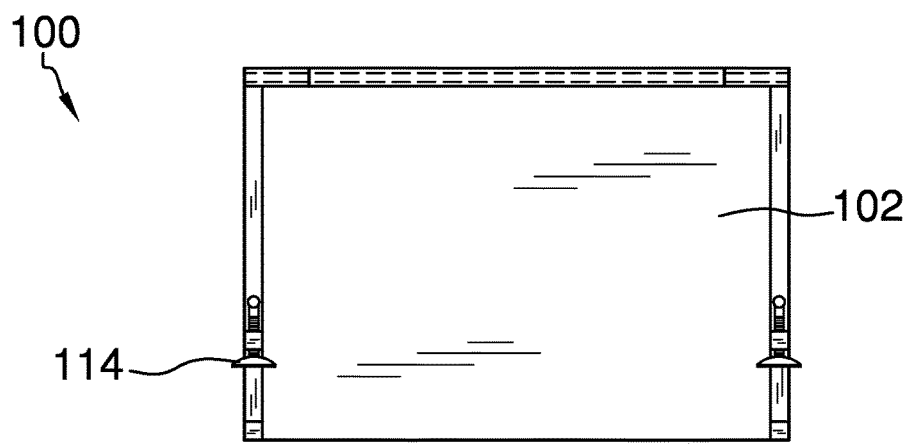
FIG. 4 is a bottom view of an embodiment of the disclosure.

It shall be noted that the folding ramp 101 has a ramp length 161. It shall be noted that the back support frame 103 has a back length 162. It shall also be noted that the ramp length 161 is equal to or less than the back length 162. Referring to FIGS. 3 and 5, the invention 100 is depicted whereby the folding ramp 101 and the back support frame 103 are parallel with one another.

It shall be noted that the folding ramp 101, the tank platform 102, and the back support frame 103 are made of a material comprising metal, plastic, carbon fiber composite, or wood. Moreover, the invention 100 is made of tubing, sheeting, and square stock components that may be fastened together via methods comprising molding, bolting, nailing, riveting, gluing, welding, etc.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventors claim:

1. A RV tank storage rack comprising:
    a folding ramp that is attached to a tank platform;
    wherein a back support frame is attached to the tank platform;
    wherein a mounting member is adapted to secure the RV tank storage rack onto a bumper of an RV;
    wherein a portable tank is adapted to be positioned on the tank platform;
    wherein the tank platform is adjacent the back support frame and the folding ramp;
    wherein the tank platform is situated between the back support frame and the folding ramp;
    wherein the folding ramp is attached to a first hinge located on a first edge of the tank platform;
    wherein the first hinge enables the folding ramp to rotate from a vertical orientation to a lowered position;
    wherein the back support frame is located on a second edge of the tank platform;
    wherein the second edge is opposite of the first edge;
    wherein the back support frame is perpendicular with respect to the tank platform;
    wherein the bumper of the RV is a rear bumper of the RV;
    wherein the folding ramp is further defined with a top ramp surface that is adapted to receive the portable tank thereon;
    wherein the portable tank is able to be rolled onto the folding ramp, and onto the tank platform;
    wherein the portable tank has tank wheels that enable the portable tank to be rolled onto the folding ramp as well as the tank platform;
    wherein the mounting member extends from underneath the tank platform;
    wherein the mounting member is adjacent the second edge of the tank platform;
    wherein the mounting member is an extension of the back support frame;
    wherein the mounting member is further defined with a first mount member and a second mount member;
    wherein the first mount member is parallel with the second mount member.

2. The RV tank storage rack according to claim 1 wherein a threaded member is threadably engaged with respect to the second mount member.

3. The RV tank storage rack according to claim 2 wherein the threaded member rotates to extend a clamp member back and forth.

4. The RV tank storage rack according to claim 3 wherein the clamp member is positioned between the first mount member and the second mount member; wherein the clamp member and the first mount member are adapted to engage the rear bumper of the RV thereby securing the RV tank storage rack thereon.

5. The RV tank storage rack according to claim 4 wherein the back support frame is further defined with an a third support surface, which is adapted to interface with the portable sewage tank.

6. The RV tank storage rack according to claim 5 wherein the back support frame is also further defined with a pair of vertical members that support a plurality of horizontal members there between.

7. The RV tank storage rack according to claim 6 wherein the back support frame includes a plurality of first eyelets; wherein the plurality of first eyelets are to be used in concert with straps in order to secure the portable tank thereto.

8. The RV tank storage rack according to claim 7 wherein the folding ramp includes a plurality of second eyelets; wherein the plurality of second eyelets are used in concert with the plurality of first eyelets in order to secure the portable tank between the back support frame and the folding ramp via the straps.

9. The RV tank storage rack according to claim 8 wherein the folding ramp includes a plurality of second horizontal members; wherein the plurality of second eyelets are provided on the plurality of second horizontal members as well as a perimeter ramp member; wherein the plurality of second horizontal members are affixed to the perimeter ramp member.

10. The RV tank storage rack according to claim 9 wherein the folding ramp has a ramp length; wherein the back support frame has a back length; wherein the ramp length is equal to or less than the back length.

* * * * *